United States Patent [19]

Kalvaitis

[11] 4,102,475
[45] Jul. 25, 1978

[54] TAMPER-RESISTANT ENCLOSURE FOR ELECTRICAL EQUIPMENT

[75] Inventor: Arvydas J. Kalvaitis, Northbrook, Ill.

[73] Assignee: S & C Electric Company, Chicago, Ill.

[21] Appl. No.: 837,244

[22] Filed: Sep. 27, 1977

[51] Int. Cl.² ............................................. B65D 51/16
[52] U.S. Cl. ................. 220/366; 220/85 TC; 220/3.8; 220/315
[58] Field of Search .................. 220/315, 3.8, 85 TC, 220/366

[56] References Cited

U.S. PATENT DOCUMENTS 3,685,682  8/1972  Frey ............................ 220/85 TC X
3,979,016  9/1976  Frater ................................ 220/315

Primary Examiner—George T. Hall
Attorney, Agent, or Firm—John D. Kaufmann

[57] ABSTRACT

A tamper-resistant enclosure for electrical equipment is disclosed. The enclosure includes a housing having generally upstanding and planar side walls which define a top opening. The top opening is closed by a generally horizontal and planar roof which is coextensive and congruent with the opening. Selected walls of the housing have formed at their upper edges a C-shaped structure, the open part of the C facing outwardly. The roof is formed to have a C-shaped structure around its periphery, the open part of the C facing inwardly. Facilities mount the roof to the housing so that the lower leg of the C on the roof is intermediate the legs of the C on the walls. Moreover, the upper leg of the C on the walls is intermediate the legs of the C on the roof. In this way, a labyrinth from the exterior of the enclosure to the interior is formed. Water entry through the labyrinth into the enclosure is prevented thereby, as is the insertion of wires or the like. The labyrinth, however, permits the flow of air through the enclosure around the enclosure's periphery, permitting the electrical equipment therewithin to be ventilated while remaining dry.

11 Claims, 6 Drawing Figures

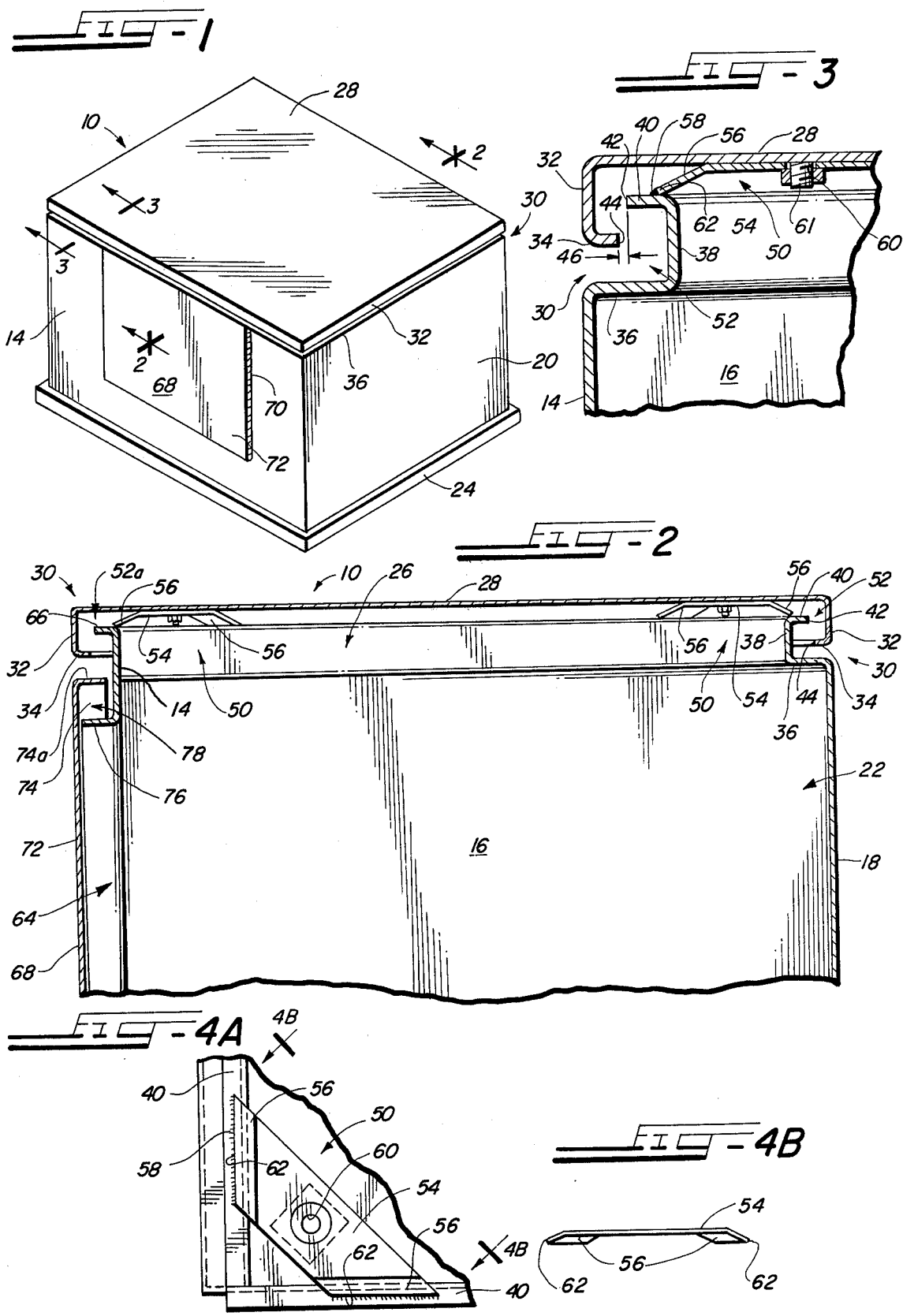

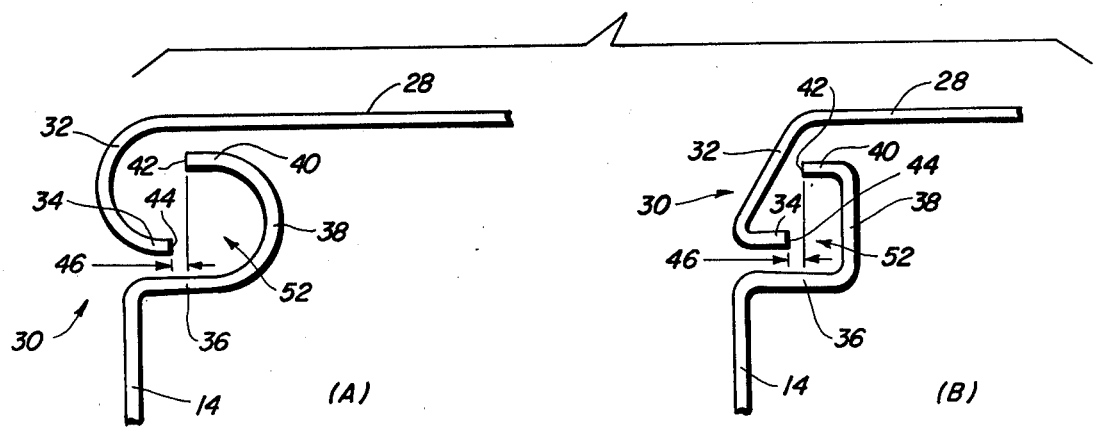
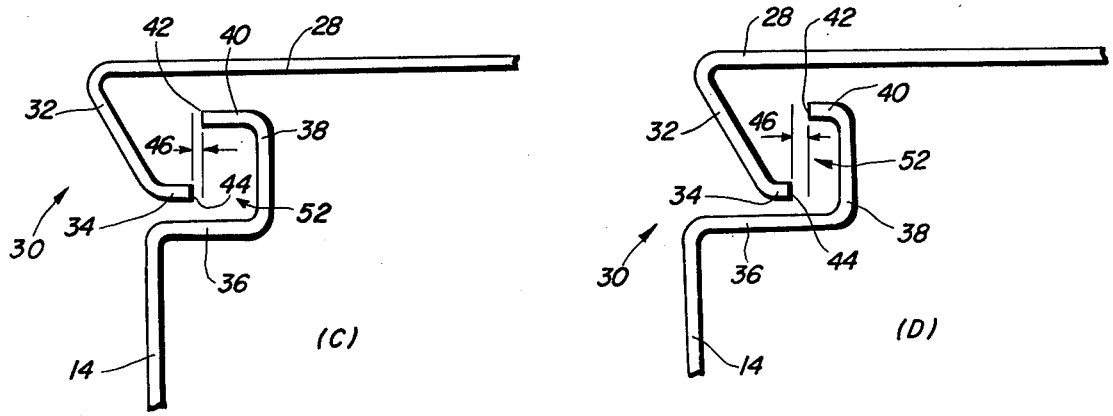
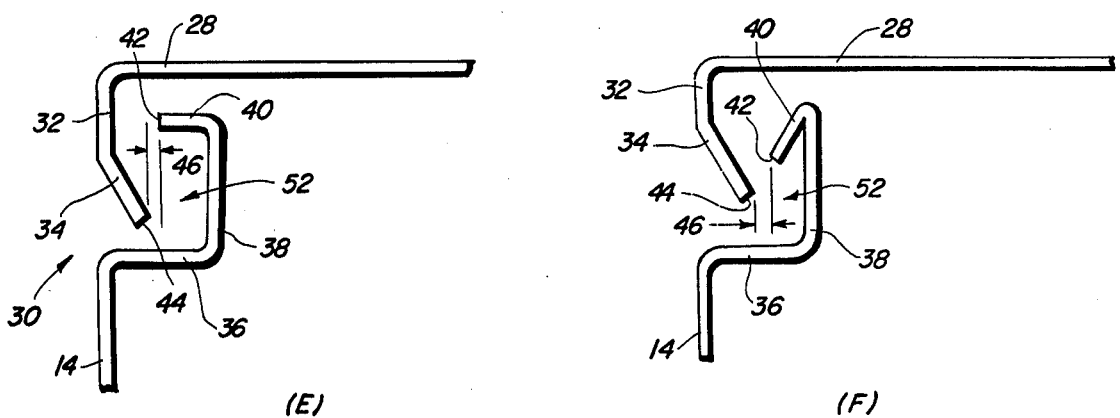
FIG-5

TAMPER-RESISTANT ENCLOSURE FOR ELECTRICAL EQUIPMENT

BACKGROUND OF THE INVENTION

1. Field of the Invention

This invention relates to an equipment enclosure, and more particularly to a tamper-resistant enclosure for electrical equipment, wherein water entry and unauthorized entry of wire-like members is obviated.

2. Description of the Prior Art

Equipment enclosures of a wide variety of types are well known. Generally, such enclosures prevent access to the equipment by unauthorized persons and provide protection of the equipment from environmental conditions. Certain types of equipment also require free ventilation thereof from the enclosure's exterior. Specifically, high-voltage electrical equipment, normally contained within a metal enclosure, often requires the free passage of air thereover to maintain the equipment dry. Moisture may be present within the enclosure by way of condensation on the electrical parts therewithin. For this and other reasons, some provision must be made for the free passage of air through the enclosure.

The venting scheme chosen should provide for free air passage through the enclosure and both prevent the entry of small animals into the gear, and prevent vandals or other interlopers from inserting into the gear a variety of objects, such as sticks or elongated metal members. In either event, the vandal or animal may well severely damage the gear, as well as becoming severely, if not fatally, injured. A well-designed venting scheme for high-voltage electrical gear should prevent, as far as possible, the entry by animals and unauthorized persons, regardless of their determination and persistence.

Regardless of the efficacy of the venting scheme chosen, the enclosure must provide another protection for the high-voltage electrical gear within the enclosure. Specifically, the venting scheme chosen, must prevent the entry of water within the enclosure in any significant quantity. Of special concern is wind- or storm-driven rain. Water entry, in any quantity, into the enclosure not only can lead to accelerated corrosion of metallic parts therewithin, but can also initiate or accelerate dielectric breakdown between the various parts within the enclosure. Accordingly, a second requirement for whatever venting scheme is chosen is the prevention of water entry in any quantity thereinto.

A third requirement for any enclosure having a venting scheme is ease of construction, including the low cost thereof.

It is desirable, then, to provide a vented enclosure for high-voltage electrical gear which permits free ventilation through the enclosure, prevents unauthorized entry by vandals or rodents, prevents the entry of water into the interior in any great quantity, and is easy and inexpensive to manufacture.

BRIEF SUMMARY OF THE INVENTION

Accordingly, one object of the present invention is to provide an equipment enclosure meeting all of the above requirements.

Another object of the present invention is to provide a tamper-resistant, water-entry-resistant, freely-ventilatable enclosure for high-voltage electrical gear, which is inexpensively and easily fabricated.

With these and other objects in view, the present invention contemplates an improved tamper-resistant equipment enclosure. The enclosure includes a housing having a top opening thereinto defined by generally upstanding planar walls. The top is closed by a generally horizontal planar roof which is coextensive and congruent with the opening. A depending flange is formed about the entire periphery of the roof. Formed on the free edge of this flange is an inwardly directed lip. The flange and the lip, together with a portion of the roof, comprise a stylized C-shaped structure with the open part of the C directed inwardly. Formed on the free edge of selected walls is an inwardly directed shelf. An upstanding rim is formed on the inner free edge of the shelf, and formed on the free edge of the rim is an outwardly directed ledge. The shelf, the rim, and the ledge, form an outwardly directed generally stylized C-shaped structure on the selected walls. Facilities are provided for interfitting and mounting the roof to the housing. These facilities effect such mounting so as to have three characteristics. First, the outer edge of the ledge is offset inwardly from the inner edge of the lip. Second, the lip is positioned between the ledge and the shelf. Third, the ledge is positioned between the lip and the roof. This interfitting of the generally stylized C-shaped structures provides a labyrinth or sinuous path from the outside of the housing to the inside thereof, thus permitting free ventilation of the interior of the housing but preventing unauthorized entry into its interior.

In some cases, a wall which was not selected for formation of the C-shaped structure thereon has an entryway therethrough. The entryway is selectively closable by a planar door. In this event, the free edge of the non-selected wall has formed thereon an outwardly directed ledge which is co-planar with the ledge formed on the selected walls. Formed on the upper edge of the door is an inwardly-directed shelf which is co-planar with the shelf on the selected walls. With the door closing the entryway, the shelf thereon cooperates with the ledge on the top of the non-selected wall to perform the same function, described above, in concert with the C-shaped structure on the roof.

BRIEF DESCRIPTION OF THE DRAWINGS

FIG. 1 is an exterior, isometric view of an equipment enclosure according to the principles of the present invention.

FIG. 2 is a sectional view taken along line 2—2 of FIG. 1 showing, in greater detail, a roof and a housing of the enclosure in accordance with the principles of the present invention;

FIG. 3 is an enlargement of a part of FIG. 2 taken along line 3—3 of FIG. 1 showing, in greater detail, the mode of fabrication of, and the interconnection between, the roof and the walls of the enclosure of the present invention;

FIGS. 4A and 4B are enlarged views of facilities for mounting together the roof and the housing of FIGS. 1–3; and FIG. 5 depicts alternative arrangements of the structure shown in FIGS. 2 and 3.

DETAILED DESCRIPTION OF THE INVENTION

An enclosure 10 according to the principles of the present invention is depicted in FIGS. 1 and 2. The enclosure is designed for housing equipment, such as high-voltage electrical equipment. Obviously, other types of equipment may be contained within the enclosure 10. Where high-voltage electrical equipment is present, the enclosure may take the form of a box-like structure having a plurality of upstanding, planar walls 14, 16, 18, and 20. The walls 14–20 are preferably made of heavy gauge steel, but other materials may be chosen. The walls 14 – 20 define an enclosed space 22 wherein the equipment 12 resides. Typically, the enclosure 10 rests on a concrete pad 24 to which the walls 14 – 20 are mounted by any conventional means. The concrete pad 24 may be replaced by a bottom member made of a material similar to the walls 14 – 20, or may rest on any other convenient structural member or support.

The walls 14 – 20 also define a top opening 26 which is closed by a generally planar roof 28, thus making the enclosure 10 integral. Facilities 30 are provided at or near the juncture of the roof 28 and the walls 14 – 20, in accordance with the principles of the present invention, to permit the free ventilation of the equipment 12 within the enclosure 10, and to prevent unauthorized access to the enclosed space 22 and the equipment 12 therein by vandals or small animals. Moreover, these facilities 30 prevent the ingress into the enclosure 10 of water in any substantial amounts, particularly wind-driven rain or the like.

Referring now to FIGS. 2 and 3, the facilities 30, functionally described above, are shown in detail. The roof 28 is generally coextensive with, and shaped complementary to, the top opening 26. Depending from the peripheral edges of the roof 28 is a flange 32. As shown in cross-section in FIG. 2, it is preferred that the flange 32 be generally perpendicular to the plane of the roof 28. It is also preferred that the distance between the outside of facing or opposed flanges 32 be equal to the distance between the outside of the walls 14 – 20 in FIG. 2, with which the flanges 32 will be associated. The reason for this preference appears below.

Formed on the free end of the flange is an inwardly directed lip 34. Preferably, the lip 34 is perpendicular to the flange 32 and is accordingly generally parallel to the planar roof 28. Thus, a generally stylized C-shaped structure is provided around the periphery of the roof 28. This C-shaped structure forms a part of the facilities 30 for the functions above-described, and in addition, provides structural rigidity and strength to the roof 28, as is obvious.

Selected walls, specifically the walls 16, 18 and 20 in the case of the preferred embodiment depicted in the FIGURES, have a shelf 36 formed thereabout. The shelf 36 is inwardly directed and is preferred to be generally perpendicular to the plane of the vertically upstanding walls 16 – 20. Moreover, the shelf 36 is preferable oriented so as to be generally parallel to both the roof 28 and to the lip 34 thereon when the roof 28 is mounted to the walls 14 – 20.

Formed on the free edge of the shelf 36 is a rim 38 which is perpendicular to the shelf 36 and generally parallel to the walls 16 – 20. In the preferred embodiment, the rim 38 is parallel to the flange 32 when the roof 28 is mounted to the walls 14 – 20.

Formed on the free edge of the rim 38 is an outwardly directed ledge 40, which is preferably perpendicular to the rim 38 and parallel to the shelf 36. The shelf 36, the rim 38, and the ledge 40 constitute a generally stylized C-shaped construction at the top of the selected walls 16 – 20. This structure also forms a part of the facilities 30 for the functions described above.

As shown in FIGS. 2 and 3, when the roof 28 is mounted to the walls 14 – 20, an outer free edge 42 of the ledge 40 is inwardly offset from an inner, free edge 44 of the lip 34. This offset, of course, facilitates the mounting of the roof 28 to the walls 14 – 20, and is denoted by the reference numeral 46. In the preferred embodiment depicted, the offset 46 is approximately ⅛ inch, but other offsets may clearly be selected.

The shelf 36 has an inward dimension in the preferred embodiment equal to the sum of the outward extension of the ledge 40, the inward extension of the lip 34, and the offset 46. All of these dimensions may be adjusted or selected to be different from that depicted, however.

Mounting facilities 50 are provided for mounting the roof 28 to the walls 14 – 20. Mounting is effected so that the lip 34 is intermediate the shelf 36 and the ledge 40, and so that the ledge 40 is intermediate the lip 34 and the roof 28, thus interfitting the two C-shaped structures comprising the facilities 30. Moreover, the flange 32, beside being co-planar with the walls 14 – 20, is outwardly offset from the rim 38. These elements — the roof 28, the flange 32, the lip 34, the shelf 36, the rim 38, and the ledge 40 — accordingly define a labyrinth or sinuous passageway 52. External entry to the labyrinth 52 is via a space between the lip 34 and the shelf 36. Internal entry is via a space between the ledge 40 and the roof 28.

The space between the lip 34 and the shelf 36 is so selected as to prevent the entry of small animals or the like into the labyrinth 52. Similarly, the amount of space available in the labyrinth 52, and the spacing between the ledge 40 and the roof 28, is sufficiently small that small animals are discouraged, if not completely prevented, from entering the enclosed space 22.

An anticipated activity engaged in by vandals with respect to equipment 12 in an enclosure 10 involves attempts to insert objects into the space 22, or attempts by the vandals to pry the roof 28 from the enclosure 10.

Insertion of objects, such as elongated wires, into the space 22 is discouraged, if not absolutely prevented, by the present construction. Specifically, because of the labyrinth 52, multiple bends would have to be put into such a wire prior to its entry into the labyrinth 52. These bends would, of course, prevent the wire from traversing the labyrinth 52 and entering the space 22. Moreover, because the vandal cannot know the exact internal structure of the labyrinth 52, he will be unable to determine just what type of bends to put into the wire or other elongated object.

Prying of the roof 28 from the enclosure 10 is also obviated, primarily by the cooperation of the lip 34 and the shelf 36. Specifically, the lip 34 is made sufficiently short so that a pry bar or the like inserted between the shelf 36 and the lip 34 has insufficient purchase to pry the roof 28 upwardly. If extreme force is applied by such a pry bar, the lip 34 will deform upwardly, ultimately leading to there being no point of purchase on the roof 28 by which prying may be continued. Such prying may also involve attempts to move the roof 28 laterally of the enclosure 10. As will be discussed shortly, the mounting facilities 50 involve both welds and bolts, or other standard fasteners, so that such attempts at lateral movement of the roof 28 place these fasteners in tension or shear. Conventional fasteners are well able to withstand the forces of such prying attempts. Moreover, should extreme force be applied, the flange 32 or the top of the walls 16 – 20 near the shelf 36 are likely to deform, ultimately leading to there being no point of purchase for continued prying.

The labyrinth 50 also prevents water entry, especially wind-driven rain, into the space 22. Clearly, vertically falling rain cannot pass through the labyrinth 52. Wind-driven rain, however, may enter the space between the lip 34 and the shelf 36. Such rain will collect on and traverse the shelf 36 until it meets the rim 38. When sufficient water is present at the rim 38, it runs out of the labyrinth 52 due to gravity. If the wind is sufficiently strong to drive substantial amounts of water into the labyrinth 52, such may be driven along the shelf 36 and up the rim 38, until it reaches the ledge 40. The weight of such water will then cause it to fall back to the shelf 36 from where it runs out as before. Any water reaching the flange 32 due to extreme winds suffers a similar fate — it falls from the flange 32, or the roof 28 immediately adjacent thereto, onto the lip 34, falling from there to the shelf 36 and then out of the labyrinth 52.

Of course, any wind, whether accompanied by rain or not, freely passes through the labyrinth 52 into the space 22, then exits through the labyrinth 52 at a remote location, the water never reaching the space 22.

It should be noted that the C-shaped structure on both the walls 16 – 20 and the roof 28 are simple bends in material. These may be easily fabricated by present-day sophisticated manufacturing techniques, and present little, if any, difficulty from the standpoint of labor or material costs.

Referring now to FIGS. 2 – 4, there is shown in detail the mounting facilities 50 for mounting the roof 28 to the walls 14 – 20. The mounting facilities 50 are seen to comprise a strut or trapezoidal member 54. The ends 56 of the strut 54 are formed downwardly, as shown. The edges bounding these ends 56 are so angularly related that, when the strut 54 occupies its preferred position in a corner formed by the meeting of two of the walls 14 – 20, these ends 56 are generally parallel to the walls 14 – 20. The edges of each end 56 are mounted by any conventional means, as by welding, to the ledge of two adjacent walls which meet in a corner. Such a weld is shown at 58 in FIG. 3. Centrally located in the strut 54 is an aperture or hole 60 which receives a threaded stud or member 61 which has been attached, as by welding, to the underside of the roof 28. A threaded member, such as a nut, engages the stud 61 after it enters the hole 60 for attaching the roof 28 to the walls 14 – 20. The difference in height between the major surface of the strut 54 and the edge of the ends 56, denoted by the reference numeral 62, is selected so as to space the roof 28 from the top of the ledges 40, and similarly spaces the ledge 40 above the lip 34, as shown in FIGS. 2 and 3. Obviously, other mounting facilities, such as angle brackets or the like, may be used to the same end as the strut 54, and may be located elsewhere than in a corner formed by two walls.

Referring again to FIGS. 1 and 2, in the preferred embodiment of the subject enclosure 10, one of the walls, here the wall 14, has an entryway 64 formed therethrough. In this event, the wall 14 is a wall not selected for formation of a shelf 36 entirely thereon. That is, depending on the size of the entryway 64, the wall 14 either does not contain a rim 38 or a ledge 40 in the same manner as do the other walls 16 – 20, or has such a rim 38 and ledge 40 formed only on a part thereof. The nonselected wall 14 contains, on at least a part of its upper edge, a ledge 66 outwardly extending from the opening 26 and being dimensioned similarly to the ledge 40. Moreover, the ledge 66 is coplanar with the ledge 40 and serves the same function in cooperation with the lip 34, the flange 32, and the roof 28.

The entryway 64 is selectively closable by a door 68 which may be mounted to a hinge 70 on the wall 14 at one edge of the door 68. In a preferred embodiment, the door 68 comprises a generally planar member 72 and four walls 74, as shown. A top wall 74 of the door 68 comprises a shelf 74a which serves a similar function to the shelf 36, but which is mounted to the door 68. The shelf 74a is dimensioned similar to the shelf 36 and is coplanar therewith and forms an effective continuation of any shelf 36 formed on a part of the wall 14. Thus, when the door 68 closes the entryway 64, the shelf 74a thereon and the ledge 66 on the nonselected wall 14, along with the lip 34, the flange 32 and the roof 28, form a labyrinth or sinuous passage 52a, similar to the labyrinth 52 previously described. The ledge 66, the shelf 74a and the wall 14 portion below the ledge 66 describe the above noted, generally stylized C-shaped structure. Also, with the door 68 closed, the shelf 74a is quite close to, or abuts, the wall 14.

Also in the preferred embodiment, when the door 68 takes the above described form, the entryway 64 has around its entire periphery a cowl 76, which extends outwardly. The cowl 76 is so dimensioned that when the door is closed, it is slightly spaced from the interior surface of the planar member 72 of the door 68. The upper part of the cowl 76, immediately below the shelf 74a, forms in combination therewith a labyrinth or sinuous path 78, preventing the entry of animals thereinto, the insertion of elongated members or the like by a vandal, and water entry into the space 22.

Although certain preferred embodiments of the present invention are described in the foregoing detailed description, it should be understood that this invention is not limited to those specific embodiments but is capable of modification and rearrangement. For example, the equipment 12 within the enclosure 10 need not be high-voltage electrical gear and may be any other gear which is desired to be both ventilated and tamper-proof. Moreover, the enclosure 10 may be made out of materials other than the preferred steel, depending on the degree of security desired. Additionally, although various portions of the stylized, generally C-shaped structures on the roof 28 and the walls 14 – 20 have been described as having perpendicular or parallel relationships to their adjacent elements, other angular orientations are permitted, as shown in FIG. 5. The only crucial orientation is that which produces the offset 46 between the ledge 40 and the lip 34 so that the roof 28 may be easily placed over the opening 26 in assembling the enclosure 10 to produce the labyrinths 52 and 52a.

In the preferred embodiments described, the flange 32 and the walls 14 – 20 are coplanar. The primary purpose of this orientation is cosmetic, in that an enclosure 10 having clean, continuous lines is produced; the orientation also adds a "rain-shielding" property to the enclosure 10 by eliminating water-collecting surfaces and provides a minimum purchase for prying. However, just as the various elements of the C-shaped structure may be angularly oriented with respect to each other at angles other than right angles, so too the flange 32 may be offset from a wall adjacent thereto, either inwardly or outwardly, if cosmetic appearances are not important. FIG. 5 also shows a variety of such additional configurations. The examples of FIG. 5 are not intended to be limiting, but are merely exemplary of the other orientations which may be taken. Reference numerals, which are the same as those in earlier figures of this disclosure, are used for similar parts.

I claim:

1. An improved equipment enclosure of the type including a housing having an opening defined by generally planar walls, the opening being closed by a generally planar cover co-extensive with the opening; wherein the improvement comprises:
   (a) a flange formed on at least a portion of the periphery of the cover;
   (b) an inwardly directed lip formed on the periphery of the free edge of the flange;
   (c) an inwardly directed first shelf formed on at least a portion of the free edge of one or more selected walls;
   (d) a rim formed on the inner edge of the shelf;
   (e) an outwardly directed first ledge formed on the free edge of the rim; and
   (f) means for mounting the cover to the housing so that
      (i) the outer edge of the ledge is offset inwardly from the inner edge of the lip,
      (ii) the lip is positioned between the ledge and the shelf, and
      (iii) the ledge is positioned between the lip and the cover.

2. The enclosure of claim 1 in which a wall thereof, not selected for formation of the shelf entirely thereon, has an entryway selectively closable by a generally planar door, wherein the improvement further comprises:
   (g) an outwardly directed second ledge formed on at least a portion of the free edge of the non-selected wall coplanar with the first ledge; and
   (h) an inwardly directed second shelf formed on a free edge of the door coplanar with the first shelf and coextensive with the second ledge.

3. The enclosure of claim 2 which further comprises an outwardly directed cowl at the periphery of the entryway, a portion of the cowl being subjacent the second shelf.

4. The enclosure of claim 1 wherein the supporting means comprises a strut, an end of which is attached to the ledge, a central portion of which is attached to the cover.

5. The enclosure of claim 1 wherein the flange is co-planar with the walls and the inward extent of the shelf is equal to the sum of the outward extent of the ledge, the inward extent of the lip and the amount of the offset.

6. The enclosure of claim 1 wherein the extent of the flange away from the cover is equal to the extent of the rim away from the shelf.

7. The enclosure of claim 1 wherein the flange, the rim, and the walls are mutually parallel; the cover, the ledge, the lip, and the shelf are mutually parallel; and the flange is perpendicular to the plane of the cover.

8. The enclosure of claim 7 wherein the flange is coplanar with the walls.

9. An improved, tamper-resistant, walled equipment enclosure of the type including a housing having an opening which is closed by a planar roof generally coextensive with the opening, wherein the improvement comprises:
   (a) a depending flange formed on the periphery of the roof;
   (b) an inwardly directed lip formed on the periphery of the free edge of the flange;
   (c) a shelf formed on the periphery of the opening;
   (d) an upstanding rim formed on the free edge of the shelf;
   (e) an outwardly directed ledge formed on the free end of the rim; and
   (f) means for mounting the cover to the housing so that
      (i) the free edge of the ledge is offset inwardly from the free edge of the lip,
      (ii) the lip is between the ledge and the shelf, and
      (iii) the ledge is between the lip and the roof.

10. An improved tamper-resistant equipment enclosure of the type including a walled housing open at the top, the top being closed by a roof, wherein the improvement comprises:
    (a) a downwardly depending flange perpendicularly formed peripherally about the roof, parallel to and in vertical alignment with, the walls of the housing;
    (b) an inwardly directed lip formed peripherally on the lower edge of the flange, the lip being generally parallel to the roof;
    (c) an inwardly directed shelf formed at the upper edge of selected walls, the shelf being parallel to the lip;
    (d) an upstanding rim formed on the inner edge of the shelf parallel to the flange and having a vertical dimension approximately equal to that of the flange
    (e) an outwardly directed ledge formed on the upper edge of the rim parallel to the shelf, the outer edge of the ledge being offset inwardly from the inner edge of the lip parallel to the roof; and
    (f) means for mounting the roof to the housing so that the lip is positioned intermediate the ledge and the shelf, and the ledge is positioned intermediate the lip and the roof.

11. An improved equipment enclosure of the type including a housing having an opening defined by generally planar walls, the opening being closed by a generally planar cover coextensive with the opening; wherein the improvement comprises:
    a first C-shaped structure on at least a portion of the periphery of the cover, a first leg of the first C being formed by the cover, the open side of the first C facing the center of the cover; and
    a second C-shaped structure on at least a portion of the free edge of one or more walls, a first leg of the second C being connected to the free edge, the open side of the second C facing away from the center of the opening, the second leg of each C being positioned between both legs of the other C.

* * * * *